Patented Aug. 29, 1939

2,170,996

UNITED STATES PATENT OFFICE 2,170,996

ETHYLENE GLYCOL DI-(ARYLOXY-ACETATES)

Ernest F. Grether, William R. Shawver, and Russell B. Du Vall, Midland, Mich., assignors to The Dow Chemical Company, Midland, Mich., a corporation of Michigan No Drawing. Application May 8, 1936, Serial No. 78,663

6 Claims. (Cl. 260—473)

This invention concerns new aryloxy-acetic acid esters of ethylene glycol having the general formula

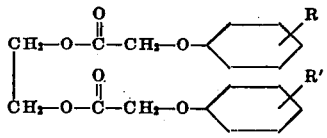

wherein R and R' represent the same or different hydrocarbon residues selected from the class consisting of alkyl, cycloalkyl, aryl, and aralkyl radicals.

These ethylene glycol di-(aryloxy-acetates) are in most instances white crystalline compounds which are unusually stable against hydrolysis, decomposition by heat, and discoloration by light. They are useful as plasticizers for cellulose ethers, esters, and other synthetic resins. The invention, then, consists in the new compounds hereinafter fully described and particularly pointed out in the claims.

The compounds may be prepared by heating a mixture of an aryloxy-acetic acid, e. g. 4-methyl-phenoxy-acetic acid, etc., and ethylene glycol at a pressure not greatly exceeding atmospheric, to a temperature at which reaction occurs; and thereafter separating the ester product from the reacted mixture, e. g. by fractional distillation, crystallization, etc. The aryloxy-acetic acid and ethylene glycol may be employed in any desired proportions, but the desired di-(aryloxy-acetate) products usually result in an optimum yield when approximately 2 molecular equivalents of the aryloxy-acetic acid are employed per mole of ethylene glycol. The reaction proceeds most smoothly and rapidly at temperatures between 100° and 180° C., but may be carried out at lower or higher temperatures if desired. During the heating operation water vapor is evolved by the reaction mixture and is removed from the reaction zone. For convenience the reaction is usually carried out at atmospheric pressure or slightly above, e. g. at a pressure not exceeding 10 pounds per square inch, but it may advantageously be carried out under vacuum for the purpose of facilitating the distillation of water from the mixture and thereby promoting more rapid and complete reaction. Ordinarily the reaction is substantially complete after from 1½ to 12 hours of heating under the conditions just described.

If desired, a catalyst such as an inorganic acid, e. g. sulphuric acid; acid salt, e. g. sodium acid sulphate; benzene sulphonic acid, etc., may be employed in the above method to promote rapid reaction at relatively low temperatures; but the reaction proceeds smoothly and rapidly in the absence of such catalysts, under the conditions described above.

The following examples describe certain of our new ester products and their preparation, but are not to be construed as limiting the invention. Each of the aryloxy-acetic acids used as reactants in the examples was prepared by refluxing a mixture of an alkali-(hydrocarbon-substituted)-phenate, sodium chloroacetate, and water; and thereafter separating the desired aryloxy-acetic acid product from the reaction mixture.

Example 1

A mixture of 166 grams (1 mol) of 2-methyl-phenoxy-acetic acid, 75 grams (1.21 mol) of ethylene glycol, and 2 grams of benzene sulphonic acid was heated at temperatures gradually increasing from 100° to 150° C. Water was distilled off as formed during the reaction. The mixture was heated in such manner for approximately 4 hours, i. e. until water vapor was no longer evolved, when the quantity of water collected indicated that the reaction was substantially complete. The reaction mixture was cooled, dissolved in approximately 200 cubic centimeters of benzene, and any unreacted 2-methyl-phenoxy-acetic acid extracted therefrom by washing the benzene solution with an excess of dilute aqueous sodium carbonate. The benzene solution was then dried and the benzene and unreacted ethylene glycol removed therefrom by distillation under vacuum. The residue from this preliminary distillation crystallized on cooling to yield 156 grams of a solid ester product, which was recrystallized from alcohol to obtain 112 grams (0.313 mol) of the pure ethylene glycol di-(2-methyl-phenoxy-acetate) as a white crystalline solid, melting at 57° C., and having the formula

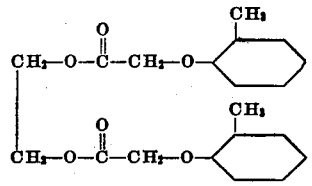

Example 2

A mixture of 166 grams (1 mol) of 3-methyl-phenoxy-actic acid, 32 grams (0.515 mol) of ethylene glycol, and 2 grams of benzene sulphonic acid was heated at temperatures gradually increasing from 140° to 150° C. for 1½ hours, water being distilled continuously from the mixture during said period of heating. The ester product was then separated from the reaction mixture as in Example 1, whereby 142 grams (0.396 mol) of ethylene glycol di-(3-methyl-phenoxy-acetate) was obtained. This product is a white crystalline material melting at approximately 74° C., and having the formula

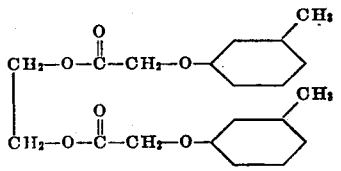

Example 3

In a similar manner 166 grams (1 mol) of 4-methyl-phenoxy-acetic acid was reacted with 32 grams (0.515 mol) of ethylene glycol to obtain 126 grams (0.352 mol) of ethylene glycol di-(4-methyl-phenoxy-acetate) as a white crystalline powder melting at 56° C., and having the formula

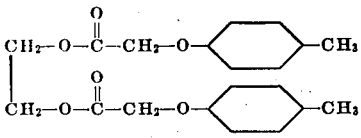

Example 4

201 grams (1 mol) of 2-chloro-4-methyl-phenoxy-acetic acid, 32 grams (0.515 mol) of ethylene glycol, and 2 grams of benzene sulphonic acid were reacted together over a period of 7 hours at temperatures ranging between 140° and 150° C. At the end of this time the reaction product was treated as described in Example 1, to obtain 70 grams (0.164 mol) of ethylene glycol di-(2-chloro-4-methyl-phenoxy-acetate) as a white crystalline product having a melting point of 74° C., and the formula

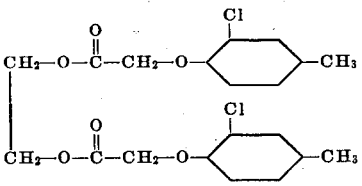

Example 5

A mixture of 90 grams (0.4 mol) of 2-phenyl-phenoxy-acetic acid and 12.4 grams (0.2 mol) of ethylene glycol was heated for 7 hours at temperatures ranging between 120° and 165° C. in the usual manner. The reacted mixture was then cooled and extracted with ethyl alcohol to remove therefrom unreacted ethylene glycol and 2-phenyl-phenoxy-acetic acid. As a residue from the extraction there was obtained 83.5 grams (0.173 mol) of an ethylene glycol di-(2-phenyl-phenoxy-acetate) product in the form of a substantially colorless viscous liquid having the specific gravity 1.183 at 60° C. and the formula

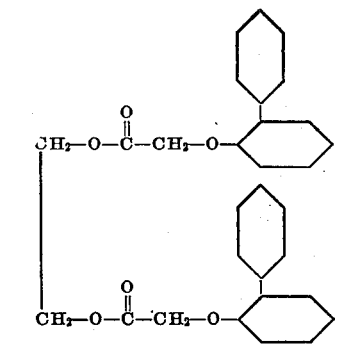

Example 6

A mixture of 83 grams (0.4 mol) of 4-tertiary-butyl-phenoxy-acetic acid, of melting point 97° C., and 12.4 grams (0.2 mol) of ethylene glycol was heated for 8½ hours at 120° to 160° C. The reacted mixture was poured with stirring into 200 cubic centimeters of 95 per cent alcohol, whereby the ester product was precipitated. The precipitate was separated by filtration, washed with cold ethyl alcohol, and air dried, to obtain 71 grams (0.161 mol) of ethylene glycol di-(4-tertiary-butyl-phenoxy-acetate). Said product is soluble in chloroform and ether, slightly soluble in benzene, and melts at approximately 77° C. It has the formula

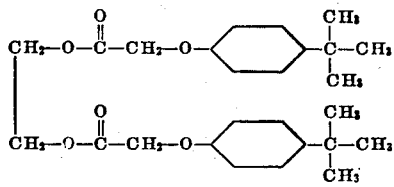

In accordance with the above-described procedures, other ethylene glycol di-(aryloxy-acetates) may be prepared, having other substituting hydrocarbon residues than those disclosed in the examples, e. g. compounds such as ethylene glycol di-(2-cyclohexyl-phenoxy-acetate), ethylene glycol di-(4-benzyl-phenoxy-acetate), and ethylene glycol di-(4-n-propyl-phenoxy-acetate), etc. By reacting ethylene glycol with aryloxy-acetic acids containing more than one hydrocarbon residue substituted in the phenyl radical, e. g. 3,5-dimethyl-phenoxy-acetic acid, 2,4-di-tertiary-butyl-phenoxy-acetic acid, etc., ethylene glycol aryloxy-acetates may be prepared containing two or more substituting hydrocarbon residues in each of the phenoxy-acetate groups.

In a modification of the above method, mixed ethylene glycol di-(aryloxy-acetates) may be prepared by reacting together an aryloxy-acetic acid and an ethylene glycol mono-(aryloxy-acetate) to obtain pure di-acetates wherein the two aryloxy-acetate groups are dissimilar. For example, 4-methyl-phenoxy-acetic acid and ethylene glycol mono-(2-phenyl-phenoxy-acetate) when reacted together form ethylene glycol (4-methyl-phenoxy-acetate)-(2-phenyl-phenoxy-acetate), while 4-isopropyl-phenoxy-acetic acid and ethylene glycol mono-(2-methyl-phenoxy-acetate) will yield on reaction ethylene glycol (4-isopropyl-phenoxy-acetate)-(2-methyl-phenoxy-acetate), etc.

In each of the above examples, a proportion of ethylene glycol mono-(aryloxy-acetate) was obtained as by-product. These derivatives are for the most part liquids or low-melting solids, somewhat more soluble in water and organic solvents than are the di-acetates. The crude reaction products comprising mixtures of the mono- and di-acetates as prepared in the examples are also valuable as plasticizers and may be used as such without separating therefrom their pure di-acetate constituents.

This application is a continuation-in-part of our prior application Serial No. 47,406, filed October 30, 1935.

Other modes of applying the principle of our invention may be employed instead of those explained, change being made as regards the method or compounds herein disclosed, provided the compounds stated by any of the following claims be obtained.

We therefore particularly point out and distinctly claim as our invention:

1. A compound having the general formula

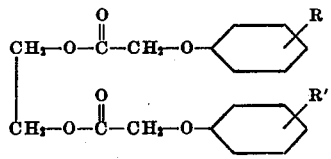

wherein R and R' represent hydrocarbon residues selected from the class consisting of the alkyl, cyclo-alkyl, aryl, and aralkyl radicals.

2. A compound having the formula

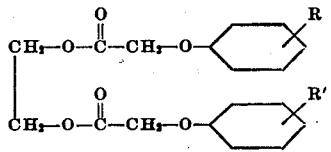

wherein R and R' represent alkyl radicals.

3. An ethylene glycol di-(methyl-phenoxy-acetate) having the formula

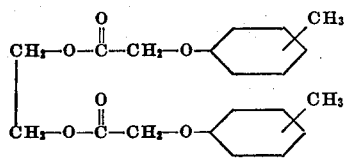

4. Ethylene glycol di-(2-methyl-phenoxy-acetate).
5. Ethylene glycol di-(3-methyl-phenoxy-acetate).
6. Ethylene glycol di-(4-methyl-phenoxy-acetate).

ERNEST F. GRETHER.
WILLIAM R. SHAWVER.
RUSSELL B. DU VALL.